Dec. 7, 1965 E. HILL, JR 3,221,635
GREASE COLLECTION DEVICE FOR STOVES
Filed May 31, 1963 2 Sheets-Sheet 1

INVENTOR.
EDWARD HILL JR.
BY
Owen, Wickersham & Erickson
ATTORNEYS

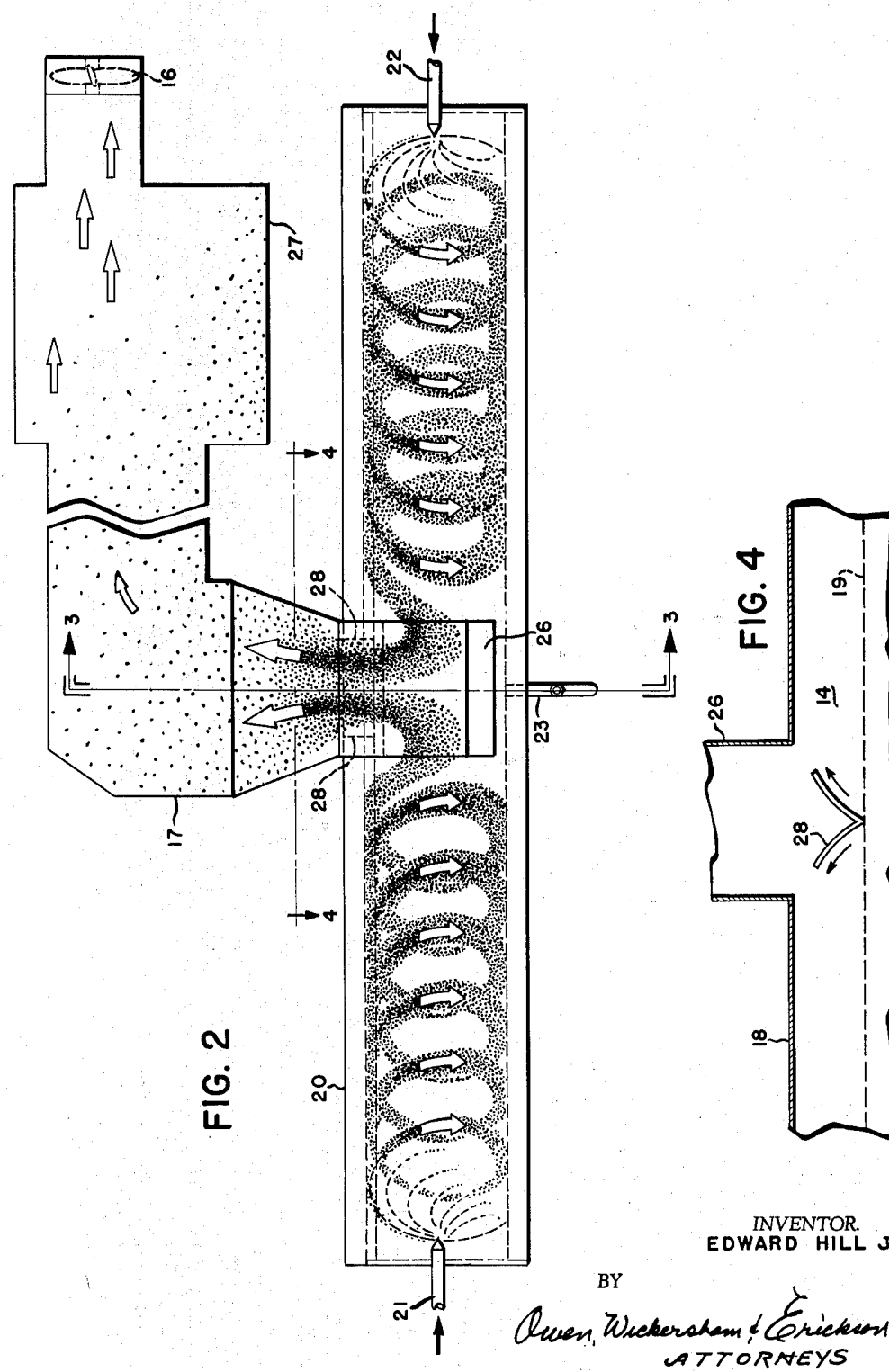

United States Patent Office 3,221,635
Patented Dec. 7, 1965

3,221,635
GREASE COLLECTION DEVICE FOR STOVES
Edward Hill, Jr., 141 Cazneau Ave., Sausalito, Calif.
Filed May 31, 1963, Ser. No. 284,675
7 Claims. (Cl. 98—115)

This invention relates to a ventilation system for enclosures, and more particularly it relates to a ventilation system for continuously removing large quantities of warm air containing smoke, grease fumes and vapors, and other particulate matter from areas such as kitchens and the like.

Ventilating large kitchen facilities in commercial or institutional establishments has long been a problem because of the large volume of heated air containing smoke, vaporized grease, and other particles which is generated and therefore must be removed. In typical systems heretofore used for such facilities, an exhaust fan was located outside the area such as on the building roof, and the contaminated air was then sucked out of the enclosure through a conduit or duct and rejected to the atmosphere. One basic problem which arose with such systems was that they lacked adequate provisions for removing the vaporized grease and other particulate matter from the air. As a result, the grease and dirt carried by the warm air removed from the area accumulated over a period of time on the inside surfaces of the air ducts leading from the kitchen to the exhaust fan, and it also accumulated on the adjacent surfaces on the downstream side of the fan. The problem became particularly serious for installations that required extensive ducting such as in large buildings where it was necessary to expel the air from only the upper levels. Ultimately, an accumulation of grease on the extended duct walls reduced the efficiency of the system and also created a serious fire hazard. The removal of such material was an expensive, time-consuming process during which time the ventilation system was inoperative.

In certain prior art systems a form of mechanical filter was utilized in the collecting hood above the stove and often an additional filtering device was used at the discharge point to reduce atmospheric contamination. However, of the various types of hood filters employed, none was ever completely effective in removing the particulate matter or vaporized grease from the air to prevent accumulation of such contaminants in the duct work downstream from the collecting hood. One reason for the limited effectiveness of such filters is due to the fact that a significant amount of the greasy contaminant is a pure vapor and therefore cannot be trapped by such devices at elevated temperatures. However, as the air proceeds downstream from the filters its temperature drops, and the vapors suspended therein condense out and form droplets which later deposit on the duct walls. A further reason why filters proved to be unsatisfactory was that in kitchens of any size the amount of heated air that had to be liberated carried such large quantities of airborne grease that the filter had an effective life of only hours and sometimes even minutes. As soon as the filter commenced to clog up the system lost its efficiency rapidly.

It is therefore a principal object of my invention to provide an improved ventilating system for enclosed areas such as kitchens that will overcome the aforesaid disadvantages of prior art systems and continuously and effectively remove grease and other particulate matter from the heated air produced therein before the air is ducted from the area to an outside exhaust outlet.

Another object is to provide an improved ventilating system for kitchen facilities that is capable of continuously removing very large quantities of warm smoke-laden air from around the stove area so as to maintain relatively normal environmental conditions within the kitchen.

More specifically, another object of the invention is to provide a ventilating system for commercial, institutional, or domestic kitchen facilities in which the grease laden air is drawn into a confined chamber where it is immediately cooled and cleaned by a fine water spray before being ducted to a remote discharging outlet. My invention thereby greatly reduces the possibility of fire within the ventilation system because practically all of the combustible material is removed from the air as it is cooled, and the small amount that may not be removed thereby is maintained at a temperature well below its flash point so no spontaneous combustion can occur within the system.

Still another object of the invention is to provide a ventilation system for kitchen facilities having an inlet hood that will capture substantially all of the cooking effluent rising from a stove before any material can escape from it to another part of the room and which then directs the captured air through a restricted velocity-increasing opening while simultaneously imparting to the air a rotary swirling action within a collector chamber in which the air is cooled and at least partially purified of grease particles and any other foreign matter by a fine water spray. The water spray is directed axially from opposite ends of the collection chamber and due to the air which flows tangentially into the chamber, the water spray has a helical pattern which thoroughly washes and cools the air as it passes through the chamber.

Another object of the invention is to provide a ventilating system from kitchens that will continuously filter the air being removed by extracting substantially all of the grease and particulate foreign matter from the air and which itself is self-cleaning in that the collected grease material is continuously removed, thereby eliminating any clogging of the filter or the necessity of cleaning it.

Yet another object of the present invention is to provide a ventilation system for kitchen facilities that is relatively easy to install and requires a minimum of maintenance because it substantially eliminates the depositing of any solid grease material on the duct walls, either upstream or downstream from the exhauster fan in the system.

A further object of the invention is to provide a ventilating system for kitchen facilities that is unusually attractive in appearance, light in weight, and particularly well adapted for ease and economy of manufacture.

Other objects, advantages and features of the invention will become apparent from the following detailed description and from the drawings, in which:

FIG. 2 is a rear view in elevation of the ventilation system of FIG. 1 showing the receiver and fan schematically and the internal circulation of the fumes within the collection;

FIG. 4 is a fragmentary plan view in section taken along line 4—4 of FIG. 2.

Figure 1:
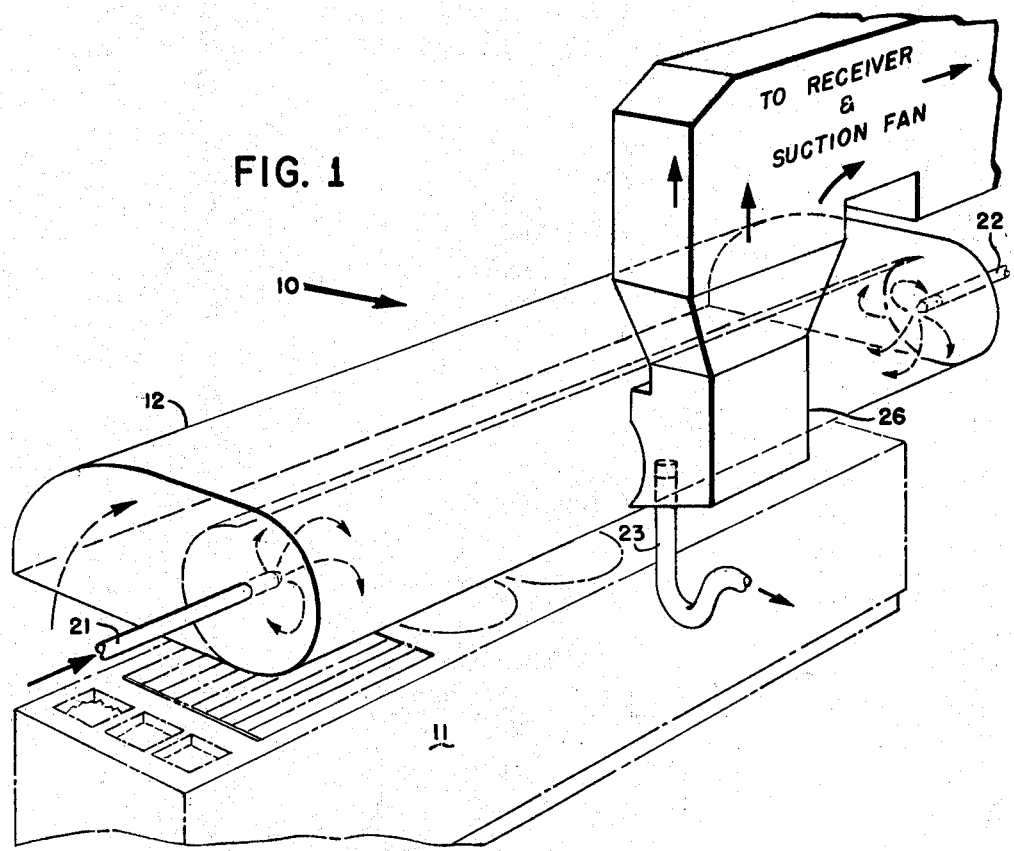
FIG. 1 is a fragmentary view in perspective showing a ventilating system embodying the principles of the invention, the receiver and fan are not shown in order to conserve space.
Figure 3:
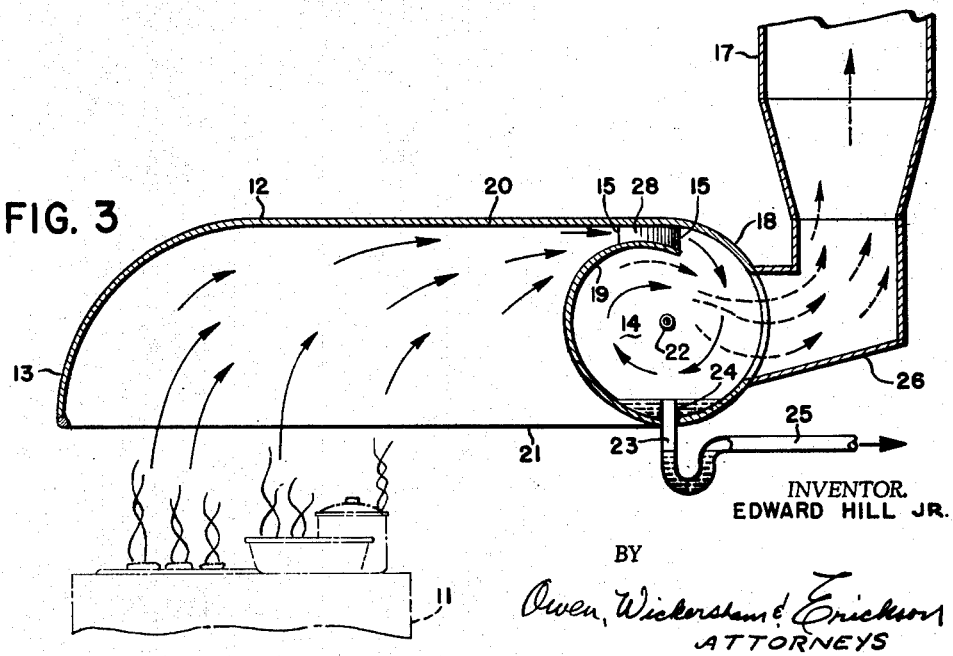
FIG. 3 is a view in elevation and in section of the ventilation system taken along line 2—2 of FIG. 2.

Referring to the drawings, FIGS. 1-3 show a ventilation system 10 embodying the principles of the invention as it appears when installed above a smoke or fume producing stove 11 in a typical commercial kitchen facility. In general the system 19 comprises an extended hood 12 made of a suitable sheet metal material that preferably covers approximately the same area as the stove and is located directly above it. Along one side 13 the hood 12 curves downwardly towards the stove to form a deflecting surface that serves to direct the rising air and gases rearwardly towards its opposite side. Along this opposite side of the hood 12 is a generally cylindrical collector chamber 14 having a narrow longitudinal inlet opening 15 adjacent the hood 12. The hot air, smoke, and grease vapors rising from the stove are drawn through the inlet opening 15 and into the collector chamber 14 by a fan 16 (FIG. 2) which is connected through a duct 17 to the collector chamber 14. The outlet fan 16 for the system 10 may be conveniently located at a place away from the kitchen or enclosure being ventilated such as on the roof of a building.

As shown in FIG. 3, the hood 12 when viewed in cross section has generally the shape of a reversed numeral 6 lying on its side. The side 18 of the hood opposite the curved deflecting side 13 curves around in a helical pattern in cross section to form the chamber 14 and its end portion 19 is spaced downwardly from inside the upper hood surface to form the elongated inlet opening 15. The main central portion 20 of the hood which serves as a canopy extending over the cooking area for capturing the hot air and gases arising therefrom is partially enclosed at its opposite ends by a pair of vertical members 21 which also enclose the ends of the collector chamber 14. In cross section the longitudinal inlet 15 to the collector chamber 14 located over the hood 12 has a variable throat due to the curvature of the inner end portion 19. The size of the throat is determined by the length of the opening 15, and other such factors such as the size and speed of the suction fan, volume of the collector, the length of the outlet duct 17, and the area of the hood 12.

At opposite ends of the collector chamber 14 are located a pair of nozzle members 21 and 22, each of which is connected to a source of water under pressure. As shown, the nozzle members 21 and 22 are supported in the end members 21 and extend axially into the chamber 14. However, other means for supporting the nozzle members may be used within the scope of the invention. Further, the nozzles may be of any suitable type capable of producing at a regulated continuous rate a fine spray pattern that is directed axially within the chamber 14 and which covers as uniformly as possible the entire cross section thereof. Near the center of the chamber 14 on its bottom side is an outlet drain tube 23 having an upper end portion 24 that extends above the bottom of the chamber 14 a predetermined amount so as to maintain water within the chamber 14 at the desired level. The lower outlet end 25 of the drain top 23 is connected to a suitable drain conduit.

The outlet duct 17 is connected to the chamber 14 by means of an elbow fitting 26 located approximately midway along its length. The size of the elbow fitting and the outlet duct 17 is also determined by the application of well known engineering principles, taking into account the characteristics of the other components of the system. It is preferably made large enough to accommodate a flow of air at speeds up to 5000 feet per minute velocity.

Located between the collector chamber 14 and the outlet fan 16 is an expansion chamber or receiver 27, as shown schematically in FIG. 3. Essentially it is an enlarged chamber that effectively reduces the velocity in the duct 17 and collects any water droplets or other fine condensed or particulate matter which has been carried by the airstream up to this point from the chamber 14. The receiver should be provided with an adequate manhole for manual inspection and cleaning, a trapped overflow to a grease trap, and a drain fitting (not shown). Also, eliminator baffles may be installed to prevent any carry-over of liquid droplets in the exhauster or suction fan. Depending on the type of system to be installed and the facilities available, the receiver 27 can be located either directly adjacent the chamber 14, or it can be located remotely therefrom and closely adjacent the outlet fan 16, as for example, on the roof of the building in which the system is installed.

In order to assure that all of the air entering through the inlet 15 into the chamber 14 will pass through the spray pattern therein, an inlet deflector 28 is provided between the end portion 19 and the upper inside wall of the hood 12 as shown in FIG. 4. The deflector 28 is essentially V-shaped and is positioned in line with the opening into the elbow 26 connected to the outlet duct 17. Thus, it prevents the air entering the inlet 15 at this location from short cutting directly across the chamber 14 and entering into the outlet duct without being adequately exposed to the water spray.

Reviewing now the operation of my ventilating system, with the exhauster or fan 16 energized a suction force is created through the duct 17 and thus established at the elongated inlet 15 within the canopy or hood 12. The hot air, smoke, and vapor rising upward from the stove or cooking area is trapped or deflected by the hood 12 and then is drawn towards the convergent-divergent inlet 15 at an increasing velocity. As this mixture of hot air and vapor passes through the restricted inlet 15, its velocity increases greatly, and since it enters tangentially into the collector 14, it is given a swirling action. The rapidly moving air carries water upward from the bottom of the collector which is diverted by the configuration of the lower lip portion 19 to form a curtain of spray across the inlet opening through which the air must pass. Simultaneously, water is sprayed from opposite ends of the collector and covers the entire cross section thereof. As shown in FIG. 3, since the air enters the cylindrical collector 14 tangentially and proceeds in a path internally tangentially, and because of the higher negative pressure at the outlet of the collector, the water spray is caused to move from the opposite ends toward the center of the collector 14 in a helical pattern through which all of the air and gases must pass. Similarly, the resultant air pattern within the collector is a helix progressively closing in the distance between turns as it approaches the outlet and progressively increasing in velocity.

Due to the contact by the hot air and gases with the water spray within the collector chamber 14, an immediate cooling effect takes place and the grease vapors within the hot air from the stove are condensed. The major portion of the condensed grease particles precipitate out and are removed from the combined air and water spray that is swirling about in the chamber 14. This removal of solid particles is aided substantially by the effects of centrifugal force imparted to the swirling mixture. Thus, as the air leaves the collector chamber 14 it is not only cooled but a major portion (e.g. 80%) of the grease, vapor and other foreign particulate matter has been condensed and removed therefrom through the overflow drain 23. The velocity of the air leaving the chamber 14 is still relatively high, in the range of up to 5000 feet per minute, and the small percentage of grease vapors that has not been removed is dissolved in fine water droplets which are now carried by the airstream until they reach the receiver 27. Within the receiver the velocity of the airstream is suddenly reduced which causes the relatively few remaining water droplets to precipitate and collect therein. The air which is finally discharged from the system by the exhauster fan 16 is now cool and thoroughly free from grease or other foreign particles so that there can be no accumulation of such material on the fan components.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A ventilating system for removing heated air, smoke, and fumes containing grease vapors and other suspended particulate matter from kitchens and the like, said systems comprising:

a combined elongated collector housing and an attached hood of sheet metal material adapted to cover an area above a smoke producing stove or the like, said hood extending generally horizontally with a downwardly curved outer edge portion on one side, said collector housing curving around in a helical pattern in cross section on the opposite side of said hood, the inside end portion of said housing being spaced downwardly from said hood to form a longitudinally extending opening directed tangentially into said collector housing along its upper side;

end wall means for enclosing the opposite ends of said collector housing;

nozzle means connected to a supply of water under pressure, mounted in said end wall means and extending generally axially within said collector for producing a continuous fine spray of water across said opening;

duct means attached to said collector housing;

a receiver in said duct means;

and a suction fan at the exit end of said duct means for causing air to flow through said longitudinal opening and through the water spray in said collector housing, thereby cooling the air and removing from it substantially all of the grease vapor and other particulate matter originally suspended therein before the air is passed through said duct means and said receiver to the atmosphere outside the room;

and drain means in said collector housing for removing the water and grease that collects in the bottom of said housing.

2. The ventilating system as described in claim 1 wherein said drain means comprises a drain pipe in said collector housing whose upper end is located above the bottom thereof to maintain a moving quantity of water within said housing at that level.

3. The ventilating system of claim 1 including a V-shaped deflector means fixed in said opening between said curved end portion of said collector housing and the hood portion directly above it, said deflector being aligned substantially in front of the entrance to said duct means, thereby preventing any short cutting of inlet air directly into said duct means.

4. A ventilating system for removing heater air, smoke, and fumes containing grease vapors and other suspended particulate matter from kitchens and the like, said system comprising:

a hood member extending generally horizontally over an area above a smoke producing stove or the like with a downwardly curved outer edge portion on one side, said hood member curving around in a helical pattern in cross section on its opposite side to form a collector housing, the end portion of said collector housing being spaced below said hood member and thereby forming a longitudinally extending opening for directing air trapped by said hood member tangentially into said collector housing along its upper side;

end wall means for enclosing the opposite ends of said collector housing and said hood member;

means for producing a continuous fine spray of water directed generally axially within said collector housing from the ends thereof and across said opening;

drain means in said collector housing for removing water and grease that accumulates in the bottom of said housing;

duct means attached to and extending rearwardly from approximately the center of said collector housing;

and a suction fan near the exit end of said duct means for causing air to flow through said longitudinal opening and the water spray in said collector housing, thereby cooling the air and removing from it substantially all of the grease vapor and other particulate matter originally suspended therein before the air is passed through said duct means to the atmosphere outside the room.

5. A ventilating system for removing heated air, smoke, and fumes containing grease vapors and other suspended particulate matter from kitchens and the like, said system comprising:

a hood member extending generally horizontally over an area above a smoke producing stove or the like with a downwardly curved outer edge portion on one side, said hood member curving around in a helical pattern in cross section on its opposite side to form a collector housing, the end portion of said collector housing being spaced below said hood member and thereby forming a longitudinally extending opening for directing air trapped by said hood member tangentially into said collector housing along its upper side, said end portion having a greater curvature than the hood member directly above thereby forming a throat having a convergent inlet portion and a divergent outlet portion at said opening;

means for producing an axially directed continuous water spray within said collector housing across said opening;

drain means in said collector housing for removing water and grease that accumulates in the bottom of said housing;

duct means attached to said collector;

a receiver in said duct means for slowing down the movement of air and thereby precipitating out any remaining droplets or particulate matter;

and a suction fan near the exit end of said duct means for causing air to flow through said longitudinal opening and the water spray in said collector housing, thereby cooling the air and removing from it substantially all of the grease vapor and other particulate matter originally suspended therein before the air is passed through said duct means to the atmosphere outside the room.

6. In a ventilating system for removing heated air, smoke and fumes containing grease vapors and other air-suspended particulate matter generated by a cooking stove or the like and including a hood positioned above the stove, an elongated generally cylindrical collector housing positioned horizontally near the smoke producing stove and located at least partially beneath the hood member;

means forming a longitudinally extending inlet opening near the upper end along one side of said cylindrical collector housing, said opening being located just beneath the hood so that air rising from the stove and trapped by the hood is directed toward said opening;

outlet duct means attached to one side of and extending from said collector housing spirally spaced from said inlet opening;

a suction fan in said duct means for causing air under the hood to flow through said longitudinal opening and generally tangentially into said collector housing, thereby creating a cycloidal flow pattern within the housing;

means for introducing a continuous supply of water into said collector housing through one end thereof, thereby causing a cooling of the air and a condensation of the grease vapors carried by it;

and drain means in said collector housing for removing the water and condensed grease that collects in the bottom of said housing.

7. A ventilating system for removing heated air, smoke and fumes containing grease vapors and other air-suspended particulate matter generated by a cooking stove or the like comprising:

an elongated and generally cylindrical collector housing oriented horizontally near the smoke producing stove;

a hood member having a downwardly turned edge along one side and attached to the top of said housing along the side opposite from said edge;

means forming a longitudinally extending opening near the top and along one side of said collector housing, said opening being located just beneath the hood so that air rising from the stove and trapped by the hood is directed tangentially into said collector housing;

end wall means for enclosing the opposite ends of said collector housing;

duct means attached to said collector housing;

a suction fan in said duct means for causing a stream of air to flow through said longitudinal opening and into said collector housing;

means for introducing a continuous supply of water into the path of the swirling air entering said collector housing, which causes a cooling of the air and a condensation of the grease vapors carried by it;

and drain means in said collector housing for removing the water, condensed grease and other particulate matter that collects in the bottom of said housing.

References Cited by the Examiner
UNITED STATES PATENTS

| | | | |
|---|---|---|---|
| 2,748,688 | 6/1956 | Smith | 98—115 X |
| 2,813,477 | 11/1957 | Gaylord | 98—115 |
| 3,031,825 | 5/1962 | La Fourniere | 55—236 |
| 3,104,961 | 9/1963 | Westlin | 55—237 |

WILLIAM F. O'DEA, *Acting Primary Examiner.*

ROBERT A. O'LEARY, *Examiner.*